United States Patent [19]

Söderberg

[11] 4,094,832
[45] June 13, 1978

[54] VINYLIC GROUP CONTAINING DEXTRAN DERIVATIVE GEL FOR USE IN ELECTROPHORETIC SEPARATION PROCESSES

[75] Inventor: John Lennart Söderberg, Upsala, Sweden

[73] Assignee: Pharmacia Fine Chemicals AB, Upsala, Sweden

[21] Appl. No.: 745,903

[22] Filed: Nov. 29, 1976

[30] Foreign Application Priority Data

Dec. 12, 1975 Sweden .................................. 7514093

[51] Int. Cl.² .............................................. C08L 5/02
[52] U.S. Cl. ........................... 260/17.4 GC; 210/31 C; 260/17.4 ST; 536/51; 536/112
[58] Field of Search ................ 260/17.4 ST, 17.4 GC; 536/51, 112; 210/31 C

[56] References Cited

U.S. PATENT DOCUMENTS

| | | | |
|---|---|---|---|
| 2,868,781 | 1/1959 | Gaertner et al. ...................... | 536/112 |
| 2,885,373 | 5/1959 | Novak .................... | 260/17.4 |
| 3,042,667 | 7/1962 | Flodin et al. .......................... | 536/112 |
| 3,208,994 | 9/1965 | Flodin ..................... | 536/112 |
| 3,561,933 | 2/1971 | Restaino et al. ..................... | 260/17.4 |
| 3,635,857 | 1/1972 | Restaino et al. ..................... | 260/17.4 |
| 3,706,661 | 12/1972 | Tangen et al. ....................... | 210/31 C |
| 3,826,767 | 7/1974 | Hoover et al. ....................... | 260/17.4 |
| 3,989,656 | 11/1976 | Kamiya et al. ....................... | 260/17.4 |

FOREIGN PATENT DOCUMENTS

| | | | |
|---|---|---|---|
| 974,054 | 11/1964 | United Kingdom ................ | 260/17.4 |
| 392,627 | 7/1973 | U.S.S.R. ............................ | 210/31 C |

OTHER PUBLICATIONS

Chem. Abst. 82:141801s, Synthesis of Unsaturated Derivatives of Cellulose and Dextran, Kolova et al.

Primary Examiner—Edward M. Woodberry
Attorney, Agent, or Firm—Fred Philpitt

[57] ABSTRACT

A dextran derivative gel for use in electrophoretic separation processes is disclosed, which gel comprises a polymerizate obtained by the free-radical homopolymerization of a dextran derivative containing vinylic groups of the formula

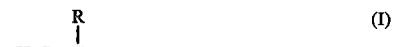

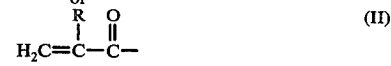

wherein A is —CH₂— or —O— and R is a hydrogen atom, a methyl group, a trifluoromethyl group, a fluorine, chlorine or bromine atom or a cyano group, or free-radical copolymerization of such a vinylic derivative of dextran with a low-molecular weight monovinyl compound.

2 Claims, No Drawings

VINYLIC GROUP CONTAINING DEXTRAN DERIVATIVE GEL FOR USE IN ELECTROPHORETIC SEPARATION PROCESSES

The present invention relates to a dextran derivative gel for use in electrophoretic separation processes.

Separation media based on dextran derivative gels and intended for use, for example, in gel chromatography, ion exchange chromatography and for chromatography in organic phases are known to the art. These media are used in particle form. The literature also describes the use of dextran derivative gels in the form of membranes (slabs) and rods in electrophoretic processes, although such slabs and rods cannot be used efficiently in practice owing to their extremely poor mechanical properties. The aforementioned, known gel products are prepared by cross-linking dextran with dialkylating substances in a strongly alkaline environment, whereafter alkali and undesirable reaction products are washed away. Further derivation, for example by introducing charged groups to the medium, is then normally effected in a separate stage, although such further derivation may optionally be effected prior to the cross-linking operation. This cross-linking method is particuarly difficult to effect when manufacturing slabs and rods, since the washing procedure is both long and troublesome. When the plates are cast directly in glass cassettes for electrophoretic use, the washing of the alkali out of the gel and diffusion of the electrophoresis buffer into the gel will take from one to three months to carry out efficiently.

The properties of dextran derivative gels which render them suitable for separating sensitive and delicate substances, such as enzymes and other proteins, are well documented. It has long been desired to extend the use of dextran derivative gels to electrophoretic techniques, owing to the fact that they can be readily degraded by dextranase, thereby releasing enclosed substances. This technique is particularly valuable for use in preparatory electrophoresis.

It has now surprisingly been found that gels possessing all the advantages of the classic dextran derivative gels but lacking their disadvantages can be prepared by free-radical homopolymerisation of a dextran derivative containing vinylic groups or by free-radical copolymerisation of such a dextran derivative with a low molecular weight monovinyl compound. In this way the inertness against biological substances is retained. The mechanical properties are considerably improved, whereby, for example, the gels can be cast to form readily handled slabs suitable for use in electrophoretic separation operations. Gels having "tailor-made" properties for specific purposes can be obtained by suitable selection of vinylic substituents and comonomers. For example, it is possible to produce gels which can be degraded by dextranase.

The following advantages are also afforded by the gel according to the invention: The electrophoresis buffer can be cast directly into the gel, thereby reducing the washing problems associated with the known gels. A special advantage is afforded by the gel according to the invention by the fact that during the preparation of the gel it is possible to introduce charged groups or other functional groups directly. For example, when so desired, charged groups can be introduced in a single synthesis stage, by using a comonomer with charged groups. Other functional groups can be introduced in a similar manner. Examples of monomers with functional groups which can be thus introduced include dimethylaminoethylmethacrylate, acrylic acid and glycidylmethacrylate.

The dextran derivative gel according to the invention is characterised by the fact that it comprises a polymerisate obtained by the free-radical homopolymerisation of a dextran derivative containing vinylic groups of the formula

where A is —CH$_2$— or —O— and R is a hydrogen atom, a methyl group, a trifluormethyl group, a fluorine, chlorine or bromine atom or a cyano group, or the free-radical copolymerisation of such a vinylic derivative of dextran with a low-molecular weight monovinyl compound.

When A represents an ether bridge (—O—), it may be formed by an oxygen atom that has belonged to a hydroxyl group in the dextran molecule or be adjacent to a molecular link coupled to the oxygen atom in a hydroxyl group in the dextran molecule. In other respects, the groups having the formulae (I) and (II) may be bound to the oxygen atom in a hydroxyl group in the dextran molecule either directly or via a molecular link, such as for example an aliphatic bridge optionally containing one or more hydroxyl groups.

In accordance with a preferred embodiment of the invention, the degree of substitution of the vinylic groups in the starting dextran derivative is 0.3 – 1.5, preferably 0.5 – 1.2 mmol/g of dextran derivative in the case of substituents of the formula (I) and 0.05 – 1 mmol/g of dextran derivative in the case of substituents of the formula (II).

As will readily be perceived, the dextran derivative may also contain other substituents with or without charged groups, such as hydroxyalkyl having preferably 2 – 5 carbon atoms such as hydroxyethyl, 2-hydroxypropyl or 2,3-dihydroxypropyl, epoxyalkyl, for example epoxypropyl, or alkyl having preferably 1 – 5 carbon atoms such as methyl or ethyl, or aralkyl such as benzylcarboxyalkyl, carboxyalkyl for example carboxymethyl, sulphoalkyl, for example sulphoethyl or sulphopropyl, aminoalkyl, preferably dialkylaminoalkyl, for example diethylaminoethyl, and quaternary ammonium groups such as triethylammoniummethyl or diethylhydroxypropylammoniummethyl.

The average molecular weight of the dextran derivative may vary to a practically unlimited extent. A suitable weight average molecular weight ($M_w$), however, is one lying between 3000 – 10,000,000, for example 70,000 – 5,000,000.

Advantageously the amount of dextran derivative containing vinylic groups is 20 – 100% by weight calculated on the total weight of the reactants. When the gel is to be capable of being degraded by endodextranase, the amount of said dextran derivative is preferably 75 – 95% by weight.

The dextran derivatives containing vinylic groups serving as the starting materials can be prepared in the following manner:

Allylic dextran ethers can readily be prepared by treating a strongly alkaline, aqueous solution of dextran or dextran derivative with, for example, allyl bromide, allyl glycidyl ether, methallyl chloride or dichloropropene.

Acrylic dextran derivatives (esters or amides) are prepared by careful addition of, for example, methacrylic acid chloride or acrylic acid chloride to an aqueous solution of dextran or dextran derivative (for example 3-amino-2-hydroxypropyldextran to obtain amide derivatives), which aqueous solution also contains, for example, pyridine or triethylamine.

Vinyl ethers and vinylketonic derivatives can be prepared in an analogous manner to allyl ethers with, for example, 2-bromoethyl-vinyl ether and chloromethylvinyl ketone, respectively.

Examples of dextran derivatives containing vinylic groups include allyl dextran, dextran methacrylate, dextran acrylate, 3-allyloxy-2-hydroxypropyldextran, methallyl dextran, chloroallyl dextran, 3-(acrylamido)-2-hydroxypropyl dextran and dextranvinyl ether.

Examples of vinylic groups which may be present in the starting dextran derivatives in accordance with the invention include vinyl, 1-methylvinyl, 1-(trifluoromethyl)vinyl, 1-fluorovinyl, 1-chlorovinyl, 1-bromovinyl, cyanovinyl, allyl, 2-fluoroallyl, 2-chloroallyl, 2-bromoallyl, 2-(trifluoromethyl)-allyl, 2-cyanoallyl, methallyl, acryl, methacryl, 3-allyloxy-2-hydroxypropyl, and 3-(acrylamido)-2-hydroxypropyl.

In principle, the monovinyl compound may comprise any known low molecular weight compound containing a vinylic group, preferably the group $CH_2=CR-$, where R has the aforementioned significance, although in each specific case a vinylic group is selected which is copolymerisable with the vinylic group in the dextran derivative. Suitably the monovinyl compound contains at most 20 C-atoms, preferably at most 10 C-atoms. Examples of low-molecular weight monovinylic compounds for use as starting materials for the preparation of the gel according to the invention are acrylamide, methacrylamide, N-hydroxymethylacrylamide, 2-hydroxyethylmethacrylate, vinyl acetate, acrylonitrile, acrylic acid, N,N-dimethylaminoethylmethacrylate, glycidylmethacrylate and diacetonacrylamide.

Homopolymerisation of the vinylic derivative of dextran and copolymerisation of said derivative and the low-molecular weight monovinyl compound is effected under for free-radical polymerisation suitable conditions. Preferably, the reaction is effected in aqueous solution. For example, persulphates, peroxides or azoisobutyronitrile are used as iniators. Some of these initiators may also be combined with, for instance, amino compounds accelerating the formation of radicals. Examples of such accelerators include 3-dimethylaminopropionitrile and tetramethyl-1,2-diaminoethane and sodium sulphite. Further, a redox-system of the type $H_2O_2-Fe^{2+}$ and $SO_3^{2-}-ClO_3^-$ can be used.

Polymerisation may have the form of a block polymerisation or dispersion polymerisation in accordance with known techniques. If desired, the blocks or plates obtained by the block polymerisation process can be finely divided into particle form.

The gels according to the invention are all insoluble in water and in other conventional non-decomposing solvents and comprise structurally a three-dimensional network. Depending upon their structure, the gels are swellable in the afore-mentioned solvents to varying limited degrees.

The invention will now be described in more detail with reference to a number of Examples.

EXAMPLE 1

18.0 g of dextranmethacrylate ($M_w \approx 2,000,000$, degree of substitution: 170 μmol methacryloyl groups per gram of dextran derivative) and 1.70 g of methacrylamide were dissolved in 160 ml of distilled water. Subsequent to obtaining a clear solution, there were added 17 ml of buffer concentrate, which was 0.8 M with respect to tris(hydroxymethyl)aminomethane and 0.4 M with respect to acetic acid (pH = 8.0). 0.32 g of potassium peroxodisulphate were then added. The solution was deaerated under vacuum, whereafter 40 μl N,N,N',N'-tetramethylethylenediamine were added. The solution was then immediately cast in glass cassettes having a size of 2.5 × 74 × 82 mm. Polymerisation was permitted to continue for 16 hours.

Clear and mechanically strong gel slabs were obtained which, when further water was added, exhibited only a slight increase in volume. Sample pieces of the gel were dissolved with dextranase in less than 1 hour at room temperature. (50 μg of acid endodextranase from Penicillium funiculosum on 0.25 ml of gel in an acetate buffer pH 5.5). Excellent resolution was obtained when effecting electrophoresis of human serum on the gel slabs.

The dextranmethacrylate starting material was prepared in the following manner:

200 g of dextran having an average molecular weight of 2,049,000 ($M_w = 2,049,000$, $M_n = 185,000$, $M_w/M_n = 11.05$) were dissolved in 1800 ml of distilled water and the solution transferred to a 5 l three-necked round flask provided with an agitator. 480 ml of pyridine and 0.15 g of hydroquinone were then added. 308 ml of methacrylic acid chloride were then added dropwise for 1 hour. During the addition of the methacrylic acid chloride, the flask was cooled so as to maintain a temperature of 20° C. The synthesis was continued during agitation of the solution for a further 4 hours. The dextran methacrylate was precipitated with 99% ethanol. The precipitate was dissolved in 1.5 l of distilled water, whereafter the dextran methacrylate was reprecipitated with ethanol. This precipitation procedure was repeated 8 times. The final precipitate was dissolved in 2 l of distilled water. The solution was filtered and freeze-dried.

EXAMPLE 2

Example 1 was repeated but with acrylamide instead of methacrylamide.

Mechanically stable and clear gel slabs were obtained which exhibited only a small increase in volume when further water was added. Sample pieces of the gel were dissolved by dextranase in less than 1 hour at room temperature (for the conditions, see Example 1). Good resolution was obtained when subjecting human serum to electrophoresis on the slabs.

EXAMPLE 3

Example 1 was repeated but with hydroxyethyl acrylate instead of methacrylamide.

Mechanically stable and clear gel slabs were obtained. The volume of respective slabs was greatly increased when adding further water. Sample pieces of the gels were dissolved with dextranase under the conditions recited in Example 1 in approximately 2 hours (a white precipitate was formed). Very good resolution was obtained when subjecting human serum to electrophoresis on the gel slabs.

This gel was exposed for 1 week to a 2M potassium hydroxide solution but was found not to be affected by the solution.

EXAMPLE 4

Example 1 was repeated but in this case no methacrylamide was added.

A hard and clear gel was obtained. There was no appreciable change in volume when further water was added. Other properties exhibited by the gel were the same as those given in Example 2.

EXAMPLE 5

In a manner analogous with that recited in Example 1, dextranacrylate (same molecular weight and degree of substitution as for the dextranmethacrylate recited in Example 1) was polymerised with acrylamid.

There was obtained a gel which was very stable mechanically and whose volume increased but moderately when further water was added. Other properties of the gel are the same as those recited in Example 2.

The starting material was dextranacrylate which was prepared in the same manner as the dextranmethacrylate of Example 1 but with acrylic acid chloride instead of methacrylic acid chloride.

EXAMPLE 6

A solution was prepared in the same manner as that disclosed in Example 1, but instead of being cast in glass cassettes the solution was dispersed in 400 ml of ethylene chloride containing 2% cellulose butyrate whilst being strongly agitated (bead polymerisation). Agitation was interrupted after approximately 4 hours and the spherical gel particles, approximately 100 μm in size, were filtered off and washed with acetone and water in that order.

The obtained gel particles were packed in a glass column, whereafter different proteins were gel-filtered through the column. The protein exclusion limit of the gel was determined in accordance with well known methods to approximately 150,000. A good resolution was obtained when subjecting human serum to electrophoresis in a thick suspension of the gel particles.

EXAMPLE 7

Example 6 was repeated but with dimethylaminoethyl methacrylate instead of methacrylamide.

A charged gel comprising spherical particles having a diameter of approximately 100 μm were obtained. This product can be used with electrophoretic techniques in which electroendosmosis is used.

EXAMPLE 8

Allyldextran ($M_w \approx 3,250,000$; degree of substitution 1.2 mmol allyl groups per gram of dextran derivative) was polymerised with acrylamide in the same manner as that disclosed in Example 1.

A slightly opaque, hard gel having good mechanical properties was obtained. There was no increase in volume of the gel when further water was added. The gel could be degraded with dextranase (conditions those recited in Example 1) and gave normal separation of human serum with electrophoresis.

The allyldextran starting material was prepared in the following manner:

400 g of dextran having an average molecular weight of 3,248,000 ($M_w, M_w/M_n = 27.75$) were charged to a 5 l 3-necked round flask together with 3,000 ml of distilled water. Subsequent to a clear solution being obtained, 120 g of sodium hydroxide and 4 g of sodium borohydride dissolved in 500 ml of distilled water were added. Finally, 0.4 g of hydroquinone and 200 g of allyl bromide were added. The reaction was permitted to continue for 4 hours at 60° C whilst strongly agitating the solution. The reaction was interrupted by adding 100 g of concentrated acetic acid. Subsequent to the reaction mixture cooling, the allyldextran was precipitated with 99% ethanol. Continued working-up was carried out in the same manner as that with dextranmethacrylate in Example 1.

EXAMPLE 9

Example 8 was repeated but instead of acrylamide there was used a mixture of methacrylamide and acrylamide in the weight ratio of 3:2.

A clear and mechanically stable gel was obtained whose volume increased but slightly when further water was added. The gel could be dissolved with dextranase and readily resolved human serum in electrophoresis.

EXAMPLE 10

Example 8 was repeated but instead of acrylamide vinyl acetate was used.

A clear elastic gel having rubber-like properties was obtained. The gel increased greatly in volume when further water was added. The gel could be dissolved with dextranase (conditions were those recited in Example 1).

EXAMPLE 11

Example 8 was repeated but acrylnitrile was used instead of acrylamide.

A clear elastic gel having rubber-like properties and slightly yellow in colour was obtained. The gel increased slightly in volume when further water was added.

EXAMPLE 12

Allyldextran and acrylamide were polymerised in a manner analogous with that disclosed in Example 8, although with 2% by weight allyldextran and 6% by weight acrylamide in solution. A slightly opaque gel exhibiting extremely good mechanical properties was obtained. The gel increased slightly in volume when further water was added and could not be dissolved with dextranase. Electrophoretic separation of human serum gave good resolution.

EXAMPLE 13

Example 8 was repeated but the allyldextran used had a $M_w \approx 70,000$; degree of substitution 1.3 mmol/g of dextran derivative.

A clear gel having good mechanical properties and which increased slightly in volume when further water was added, was obtained. The remaining properties of the gel were the same as those given in Example 8.

EXAMPLE 14

Example 13 was repeated but instead of allyldextran there was used a 3-allyloxy-2-hydroxypropryldextran ($M_w \approx 70,000$; degree of substitution 0.7 mmol/g of dextran derivative).

The obtained gel had the same properties as the gel of Example 13.

The 3-allyloxy-2-hydroxypropyldextran starting material was prepared in a manner analogous with the allyldextran of Example 8, although in this instance the allyl bromide was replaced by equal weight quantities of allyl glycidyl ether and the dextran was replaced by dextran having an average molecular weight of 70,000.

EXAMPLE 15

Example 9 was repeated, although in this case the dextran derivative used was 3-allyloxy-2-hydroxypropyldextran ($M_w \approx 3,250,000$; degree of substitution 0.7 mmol/g dextran derivative).

The properties of the gel obtained corresponded to the properties of the gel obtained with Example 9.

The 3-allyloxy-2-hydroxypropyldextran used as starting material was prepared in a corresponding manner to the dextran derivative in Example 14, although in this case the dextran had the same mean molecular weight as that used in Example 8.

EXAMPLE 16

Example 9 was repeated although in this case the dextran derivative had the form of 2-chloroallyldextran ($M_w \approx 3,250,000$; degree of substitution 0.56 mmol/g of dextran derivative).

The properties of the gel obtained corresponded to those of the gel obtained in Example 9 although in this case the gel gave better resolution in electrophoresis.

The 2-chloroallyldextran used as starting material was prepared in a manner analogous with the allyldextran of Example 8, although in this case the allyl bromide was replaced with an equal number of moles of 2,3-dichloropropane.

EXAMPLE 17

Example 9 was repeated although in this case the dextran derivative used was methallyldextran ($M_w \approx 3,250,000$; degree of substitution 0.6 mmol/g of dextran derivative).

The properties of the gel obtained corresponded to those obtained with the gel according to Example 16.

The dextran derivative used as the starting material was prepared in a manner analogous with the allyldextran used in Example 8, although in this instance the allyl bromide was replaced by an equal number of moles of methallyl chloride.

EXAMPLE 18

16 g of allyldextran ($M_w \approx 3,250,000$; degree of substitution 1.2 mmol/g of dextran derivative) and 4 g of acrylamide were dissolved in 80 ml buffer which was 0.5 molar with respect to tris(hydroxymethyl)aminomethane and 0.04 molar with respect to acetic acid (pH 8.0), whereafter 0.5 g of potassium peroxodisulphate were added. The polymerisation was permitted to continue for 16 hours.

A clear, hard and mechanically stable gel was obtained which contained approximately 80% water.

EXAMPLE 19

A pore gradient gel was prepared from a solution prepared in accordance with Example 9 and a solution prepared in accordance with Example 18. Each of the solutions was poured into a respective container of a gradient mixer, and the mixture was pumped into glass cassettes from beneath so that an increasing dextran derivative concentration was obtained towards the bottom of the glass cassettes. The polymerisation was permitted to continue for 16 hours.

Clear and mechanically stable gradient gels were obtained. Very good resolution was obtained subsequent to subjecting human serum to electrophoresis on the gels for 4 hours.

What is claimed is:

1. A dextran derivative gel for use in electrophoretic separation processes, which gel comprises a polymerisate obtained by the free-radical homopolymerization of a dextran derivative containing vinylic groups of the formula

or

in which A is $-CH_2$ or $-O-$ and R is a hydrogen atom, a methyl group, a trifluoromethyl group, a fluorine, chlorine or bromine atom or a cyano group, or free-radical copolymerization of such a vinylic derivative of dextran with a low-molecular weight monovinyl compound, the degree of substitution of the vinylic groups in the starting dextran derivative being 0.3 – 1.5 mmol/g of dextran derivative in the case of substituents of the formula (I) and 0.05 – 1 mmol/g of dextran derivative in the case of substituents of the formula (II) and the amount of dextran derivative containing vinylic groups being 20 – 100% by weight, calculated on the total weight of the reactants.

2. A dextran derivative gel according to claim 1, wherein the degree of substitution of the vinylic groups of the formula (I) in the starting dextran derivative is 0.5 – 1.2 mmol/g of dextran derivative.